US009252492B2

(12) United States Patent
Alrabadi et al.

(10) Patent No.: US 9,252,492 B2
(45) Date of Patent: Feb. 2, 2016

(54) ANTENNA TUNING VIA MULTI-FEED TRANSCEIVER ARCHITECTURE

(75) Inventors: Osama Nafeth Alrabadi, Aalborg (DK); Alexandru Daniel Tatomirescu, Aalborg (DK); Mikael Bergholz Knudsen, Gistrup (DK); Gert F. Pedersen, Storvorde (DK); Mauro Pelosi, Aalborg (DK); Samantha Caporal Del Barrio, Aalborg (DK); Poul Olesen, Stovring (DK); Peter Bundgaard, Aalborg (DK)

(73) Assignee: Intel Deutschland GmbH, Neubiberg (DE)

( * ) Notice: Subject to any disclaimer, the term of this patent is extended or adjusted under 35 U.S.C. 154(b) by 640 days.

(21) Appl. No.: 13/597,910

(22) Filed: Aug. 29, 2012

(65) Prior Publication Data

US 2014/0062813 A1 Mar. 6, 2014

(51) Int. Cl.

*H04B 1/04* (2006.01)
*H01Q 9/04* (2006.01)
*H01Q 5/35* (2015.01)

(52) U.S. Cl.

CPC ............... *H01Q 9/0421* (2013.01); *H01Q 5/35* (2015.01)

(58) Field of Classification Search

CPC ............. H01Q 21/28; H01Q 21/0006; H01Q 21/0087; H01Q 21/08; H01Q 21/20; H01Q 21/205; H01Q 21/26; H01Q 9/045; H01Q 9/16; H01Q 1/521; H01Q 1/125; H01Q 1/523; H01Q 21/24; H01Q 9/0442; H01Q 9/30; H01Q 13/28; H01Q 1/24; H01Q 1/28; H01Q 1/34; H01Q 21/06; H01Q 25/00; H01Q 3/2617; H01Q 3/267; H01Q 3/36; H01Q 3/443; H04B 1/40; H04B 7/10; H04B 7/0413; H04B 7/04; H04B 7/0802; H04B 1/18; H04B 5/0081; H04B 7/02; H04B 7/026; H04B 7/0469; H04B 7/0608; H04W 16/28; H04W 88/02

USPC ................................ 455/562.1, 129, 60, 561

See application file for complete search history.

(56) References Cited

U.S. PATENT DOCUMENTS

| | | | |
|---|---|---|---|
| 5,872,481 | A | 2/1999 | Sevic et al. |
| 6,070,090 | A | 5/2000 | Feuerstein |

(Continued)

FOREIGN PATENT DOCUMENTS

| | | | |
|---|---|---|---|
| CN | 101523759 | A | 9/2009 |
| WO | 9826503 | A1 | 6/1998 |
| WO | 2008049191 | A1 | 5/2008 |

OTHER PUBLICATIONS

K. A. Jose, V. K. Varadan, and V. V. Varadan, Experimental investigations on electronically tunable microstrip antennas, Microw. Opt. Technol. Lett., vol. 20, No. 3, pp. 166169, Feb. 1999.

(Continued)

*Primary Examiner* — Lana N Le

(74) *Attorney, Agent, or Firm* — Eschweiler & Associates, LLC

(57) ABSTRACT

The disclosed invention relates to an antenna configuration that is configured to tune the frequency of transmission without using filters. The antenna configuration comprises a tunable multi-feed antenna configured to wirelessly transmit electromagnetic radiation. A signal generator is configured to generate a plurality of signals that collectively correspond to a signal to be transmitted. The plurality of signals have a phase shift or amplitude difference therebetween. The plurality of signals are provided to a plurality of antenna feeds connected to different spatial locations of the tunable multi-feed antenna. The values of the phase shift and/or amplitude difference define an antenna reflection coefficient that controls the frequency characteristics that the tunable multi-feed antenna operates at, such that by varying the phase shift and or amplitude difference, the frequency characteristics can be selectively adjusted.

20 Claims, 6 Drawing Sheets

(56) References Cited

U.S. PATENT DOCUMENTS

| | | | | |
|---|---|---|---|---|
| 6,072,994 | A * | 6/2000 | Phillips et al. | 455/84 |
| 8,610,832 | B2 * | 12/2013 | Frerking | 348/723 |
| 2002/0126051 | A1 * | 9/2002 | Jha | 343/702 |
| 2004/0214604 | A1 * | 10/2004 | Yoon et al. | 455/562.1 |
| 2009/0289861 | A1 | 11/2009 | Tang et al. | |
| 2011/0053646 | A1 * | 3/2011 | Kundmann et al. | 455/562.1 |
| 2011/0199279 | A1 * | 8/2011 | Shen et al. | 343/857 |
| 2011/0215971 | A1 * | 9/2011 | Rao | 343/702 |

OTHER PUBLICATIONS

P. J. Rainville and F. J. Harackewiez, Magnetic tuning of a microstrip patch antenna fabricated on a ferrite film, IEEE Microw. and Guided Wave Lett., vol. 2, No. 12, pp. 483485, Dec. 1992.

R. K. Mishra, S. S. Pattnaik, and N. Das, Tuning of microstrip antenna on ferrite substrate, IEEE Trans. Antennas Propag., vol. 41, No. 2, pp. 230233, Feb. 1993.

J. T. Aberle, Oh Sung-Hoon, Auckland, D.T., Rogers, S.D., Reconfigurable antennas for wireless devices, IEEE Antennas and Propagation Magazine, vol. 45, No. 6, pp. 148-154, Dec. 2000.

P. K. Panayi, M. O. Al-Nuaimi, I. P. Ivrissimtzis, Tuning techniques for planar inverted-F antenna, Electronics Letters , vol. 37, No. 16, pp. 1003-1004, Aug. 2, 2001.

A.-F. Sheta, S. F. Mahmoud, A Widely Tuneable Compact Patch Antenna, IEEE Antennas and Wireless Propagation Letters, vol. 7, No., pp. 40-42, 2008.

D. Peroulis, K. Sarabandi, L. P. B. Katehi, Design of reconfigurable slot antennas, IEEE Transactions on Antennas and Propagation , vol. 53, No. 2, pp. 645-654, Feb. 2005.

Li Hui, Xiong Jiang, Yu Yufeng, He Sailing , A Simple Compact Reconfigurable Slot Antenna With a Very Wide Tuning Range, IEEE Transactions on Antennas and Propagation, , vol. 58, No. 11, pp. 3725-3728, Nov. 2010.

S. Kawasaki, T. Itoh, A slot antenna with electronically tunable length, International Symposium on Antennas and Propagation Society, 1991. AP-S. Digest , vol., No., pp. 130-133 vol. 1, Jun. 24-28, 1991.

J. Ollikainen, O. Kivekas, P. Vainikainen, Low-loss tuning circuits for frequency-tunable small resonant antennas, Symposium on Personal, Indoor and Mobile Radio Communications, vol. 4, No., pp. 1882-1887 vol. 4, Sep. 15-18, 2002.

R. Valkonen, J. Holopainen, C. Icheln, P. Vainikainen, Broadband Tuning of Mobile Terminal Antennas, Second European Conference on Antennas and Propagation, 2007( EuCAP 2007), vol., No., pp. 1-6, Nov. 11-16, 2007.

S. Maryam Mazinani and Hamid Reza Hassani, Superdirective Wideband Array of Planar Monopole Antenna With Loading Plate, IEEE antennas and wireless propagation letters, vol. 9 2010.

F. Ferrero, A Diallo,. C. Luxey, B. Derat, Phased two-element PIFA for adaptative pattern in UMTS handsets, IEEE International Workshop on Antenna Technology, 2009 ( iWAT 2009), pp. 1-4, Mar. 2-4, 2009.

V. Radisic, S. T. Chew, Y. Qian, and T. Itoh, High-efficiency power amplifier integrated with antenna, IEEE Microwave Guided Wave Lett., vol. 7, pp. 39-41, Feb. 1997.

V. Radisic, Y. Qian, and T. Itoh, Novel architectures for high efficiency amplifiers for wireless applications, IEEE Trans. Microwave Theory Tech., vol. 46, , pp. 1901-1909, Nov. 1998.

J. Lin and T. Itoh, Active integrated antennas, IEEE Trans. Microwave Theory Tech., vol. 42, pp. 2186-2194, Dec. 1994.

W. R. Deal, V. Radisic, Y. Qian, and T. Itoh, Novel push-pull integrated antenna transmitter front-end, IEEE Microwave Guided Wave Lett., vol. 8, pp. 405-407, Nov. 1998.

W. R. Deal, V. Radisic, Y. Qian, and T. Itoh, Integrated antenna push-pull power amplifiers, IEEE Trans. Microwave Theory and Tech., vol. 47, pp. 1418-1425, Aug. 1999.

* cited by examiner

ANTENNA TUNING VIA MULTI-FEED TRANSCEIVER ARCHITECTURE

BACKGROUND

Multi-band transceivers are widely used in many modern wireless communication devices (e.g., cell phones, wireless sensors, PDAs, etc.). Multi-band transceivers are able to transmit and receive electromagnetic radiation at a variety of different frequencies. For example, a dual-band mobile phone is able to transmit and receive signals at two frequencies, a quad-band mobile phone is able to transmit and receive signals at four frequencies, etc.

Operation at more than one frequency is important in modern mobile communication devices. For example, different wireless standards (e.g., GSM, TMDA, CMDA, etc.) are used in different locations around the world, such that the use of a tunable antenna allows for a cell phone to communicate over multiple wireless standards. Furthermore, even the same wireless standards may use different frequencies within a region or more than one frequency within a region. For example, within a GSM network, different regions may operate on different bands. For example, in the United States a GSM network uses two bands (e.g., 850 MHz or 1900 MH), while Europe uses two other bands.

DETAILED DESCRIPTION

Figure 1:
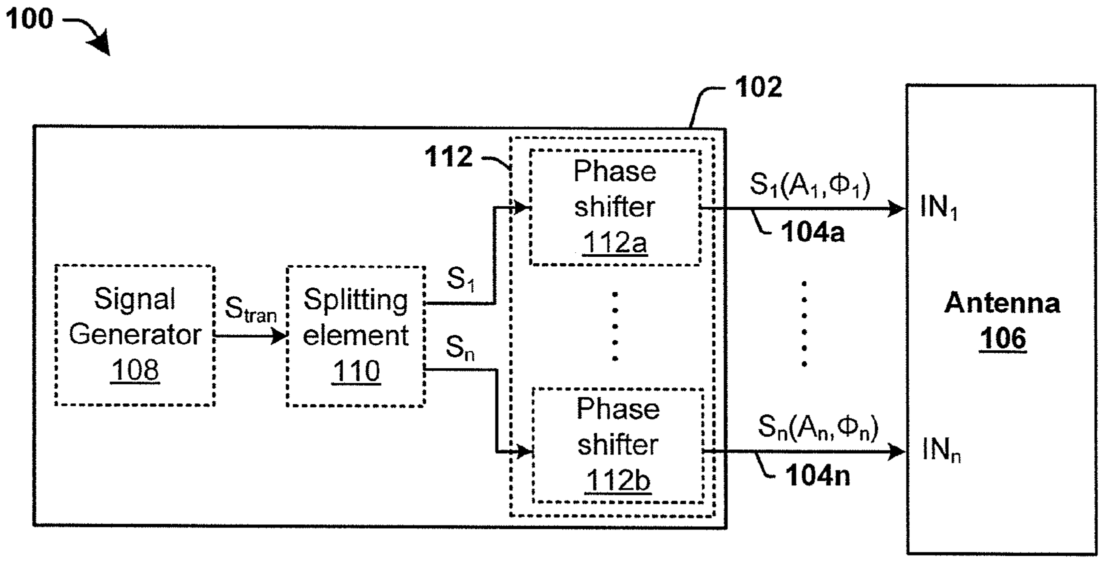
FIG. 1 illustrates a block diagram of a transmitter system comprising a tunable multi-feed antenna configured to radiate electromagnetic radiation with a plurality of frequency characteristics.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Typically, a conventional multi-band transmitter comprises a bulky wideband antenna connected to a signal generator by way of one or more filters. The wideband antenna transmits over a broad frequency range, while the one or more filters operate to attenuate transmitted radio frequency signals that are outside of a desired frequency range. While using filters in conjunction with a wideband antenna allows the transceiver to operate at a plurality of different frequencies, such a transmitter architecture has drawbacks. For example, the wideband antenna has a larger size and a lower efficiency than narrowband antennas. Furthermore, for a transmitter to operate at many frequencies, a large number of filters are used. The wideband antenna and filters increase the size, cost, and power consumption of the transmitter, which is undesirable in today's small, low power mobile communication devices.

Accordingly, the present disclosure relates to an antenna configuration comprising a tunable multi-feed antenna that is configured to tune a transmitter's frequency of transmission. The antenna configuration comprises a tunable multi-feed antenna configured to wirelessly transmit electromagnetic radiation. A signal generator is configured to generate a plurality of signals, having a specific phase shift or amplitude difference between one another, which collectively correspond to a signal to be transmitted. The plurality of signals are provided to a plurality of antenna feeds connected to different spatial locations of the tunable multi-feed antenna. The specific phase shift and/or amplitude difference define an antenna input reflection coefficient that controls the frequency characteristics that the tunable multi-feed antenna operates at, such that by varying the phase shift and or amplitude difference, the frequency characteristics can be selectively adjusted.

The disclosed tunable multi-feed antenna can mitigate the undesirable aspects of a conventional multi-band transmitter. It does so by allowing for a narrowband antenna, which has a smaller size and greater efficiency than a wideband antenna, to be used for transmitting at a plurality of frequencies. It also reduces the use of filters, since part of the RF filtering functionality is performed by the tunable multi-feed antenna itself.

FIG. 1 illustrates a block diagram of a transmitter system 100 comprising a tunable multi-feed antenna 106 configured to radiate electromagnetic radiation over a plurality of frequency characteristics (e.g., transmit frequencies, frequency band size, etc.). It will be appreciated that although the figures described herein refer to a transmitter system, that the disclosed tunable multi-band antenna may be implemented in transceiver systems also.

The transmitter system 100 comprises a transmit module 102 configured to generate a plurality of radio frequency (RF) signals $S_1(A_1, \phi_1), \ldots, S_n(A_n, \Phi_n)$, which collectively correspond to a signal-to-be-transmitted. The plurality of RF signals $S_1(A_1, \phi_1, \ldots, S_n(A_n, \phi_n)$ are versions of a same RF signal having varying phases and/or amplitudes, such that the plurality of RF signals $S_1(A_1, \phi_1), \ldots, S_n(A_n, \phi_n)$ have a phase shift (e.g., $\Delta\phi=\phi_1-\phi_2$) and/or an amplitude difference (e.g., $\Delta A=A_1-A_2$) between one another.

The transmit module 102 is in communication the tunable multi-feed antenna 106, which is configured to wirelessly transmit electromagnetic radiation over a radiation pattern spanning 360°. In some examples, the tunable multi-feed antenna 106 may comprise a narrow-band antenna. In other examples, the tunable multi-feed antenna 106 may comprise a wideband antenna or an ultra-wideband antenna, for example. The multi-feed antenna 106 comprises a plurality of antenna feeds 104*a*, . . . , 104*n* that are connected to the tunable multi-feed antenna 106 at spatially distinct input nodes $IN_1$-$IN_n$. The plurality of antenna feeds 104*a*, . . . , 104*n* are configured to concurrently provide the plurality of RF signals $S_1(A_1, \phi_1), \ldots, S_n(A_n, \phi_n)$ to the tunable multi-feed antenna 106.

In some examples, the transmit module 102 comprises a signal generator 108 (e.g., an RF source) configured to generate the signal to be transmitted $S_{tran}$. In some cases, a single ended signal to be transmitted $S_{tran}$ is output from the signal generator 108 to a splitting element 110 configured to split the signal $S_{tran}$ into a plurality of RF signals $S_1, \ldots, S_n$ that are identical to one another. The plurality of RF signals $S_1, \ldots, S_n$ are provided to an adjustment module 112 configured to independently adjust the amplitude and/or phase of the RF signals $S_1, \ldots, S_n$, resulting in the plurality of RF signals $S_1(A_1, \phi_1), \ldots, S_n(A_n, \phi_n)$ having a phase shift and/or an amplitude shift therebetween.

In some examples, the adjustment module 112 comprises one or more phase shifters, such as phase shifter 112*a* or 112*b*, configured to introduce a phase shift into one or more of the plurality of RF signals $S_1, \ldots, S_n$. In other examples, the adjustment module 112 comprises one or more vector modulators configured to adjust the phase and/or amplitude characteristics of the plurality of RF signals $S_1, \ldots, S_n$. In some embodiments, the splitting element 110 and/or the adjustment module 112 are comprised within a digital signal generator configured to generate a plurality of signals having a phase shift therebetween.

Providing the plurality of RF signals $S_1(A_1, \phi_1), \ldots, S_n(A_n, \phi_n)$, with specific phases and/or amplitudes, to a single antenna causes the signals to collectively excite the multi-feed antenna 106 in a manner that controls how the antenna resonates (i.e., controls the frequency at which the antenna transmits radiation). In some aspects, the phase shift and/or amplitude difference between the plurality of RF signals $S_1(A_1, \phi_1), \ldots, S_n(A_n, \phi_n)$ define a transmit frequency at which the tunable multi-feed antenna transmits the signal to be transmitted $S_{tran}$. For example, the plurality of signals comprise a first RF signal $S_1(A_1, \phi_1)$ having a first phase $\phi_1$ and a second RF signal $S_2(A_2, \phi_2)$ having a second phase $\phi_2$, wherein the first and second phases, $\phi_1$ and $\phi_2$ are phase shifted with respect to one another by a phase shift value $\Delta\phi$ that causes the tunable multi-feed antenna 106 to resonate at a specific frequency. The tunable multi-feed antenna 106 may comprise three or more antenna feeds 104*a*, . . . , 104*n*, the transmitter system 100 can tune frequency characteristics comprising both the value and the size of a frequency band being transmitted on.

In particular, the specific phases and/or amplitudes of the plurality of RF signals $S_1(A_1, \phi_1), \ldots, S_n(A_n, \phi_n)$ can be chosen to control the antenna input reflection coefficient $\Gamma_{in}$ of the antenna (i.e., the control power going to the antenna). By controlling the antenna input reflection coefficient $\Gamma_{in}$, the frequency of the signal transmitted by the tunable multi-feed antenna 106 may be controlled. For example, when the input reflection coefficient $\Gamma_{in}$ is set to have a low reflection coefficient at a specific frequency, the tunable multi-feed antenna will transmit at that frequency. Alternatively, when the antenna input reflection coefficient $\Gamma_{in}$ is set to have a high reflection coefficient at a specific frequency, the tunable multi-feed antenna may not transmit at that frequency.

Figure 2:
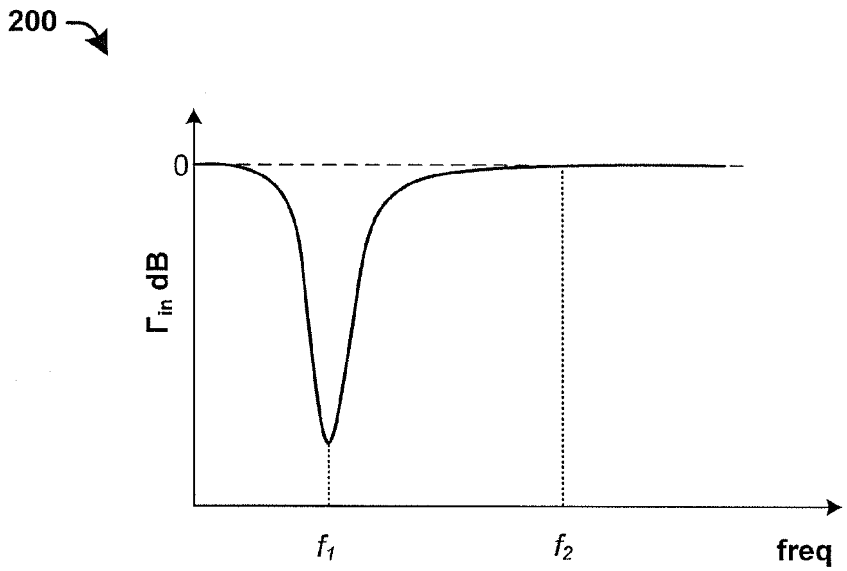
FIG. 2 illustrates a graph showing an exemplary antenna reflection coefficient as a function of frequency for a disclosed tunable multi-feed antenna.

For example, FIG. 2 illustrates a graph 200 showing an exemplary antenna input reflection coefficient $\Gamma_{in}$ (y-axis) as a function of frequency (x-axis) for a disclosed tunable multi-feed antenna. At a first frequency $f_1$, a specific combination of phases and/or amplitudes of the plurality of signals causes the antenna input reflection coefficient $\Gamma_{in}$ to have a relatively low value, such that the tunable multi-feed antenna transmits at the first frequency $f_1$ (i.e., a small amount of the energy of the plurality of signals is reflected away from the multi-feed antenna). At a second frequency $f_2$, a specific combination of phases and/or amplitudes of the plurality of signals causes the antenna input reflection coefficient $\Gamma_{in}$ to have a relatively high value, such that the tunable multi-feed antenna does not transmit at the second frequency $f_2$ (i.e., a majority of the energy of the plurality of signals is reflected away from the multi-feed antenna). Therefore, by setting the phases and/or amplitude of signals provided to different antenna feeds of a same antenna, the antenna input reflection coefficient $\Gamma_{in}$ and therefore the frequency of a transmitted signal can be tuned.

Figure 3A:
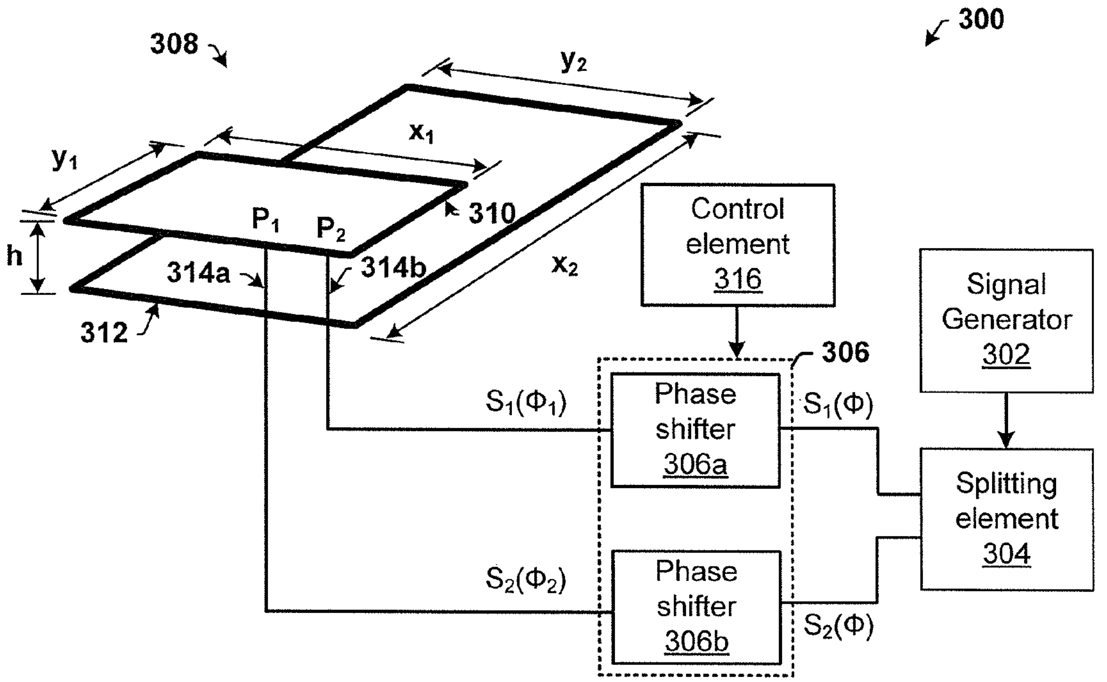
FIGS. 3A-3B illustrate an exemplary operation of a disclosed tunable multi-feed antenna.
Figure 3B:
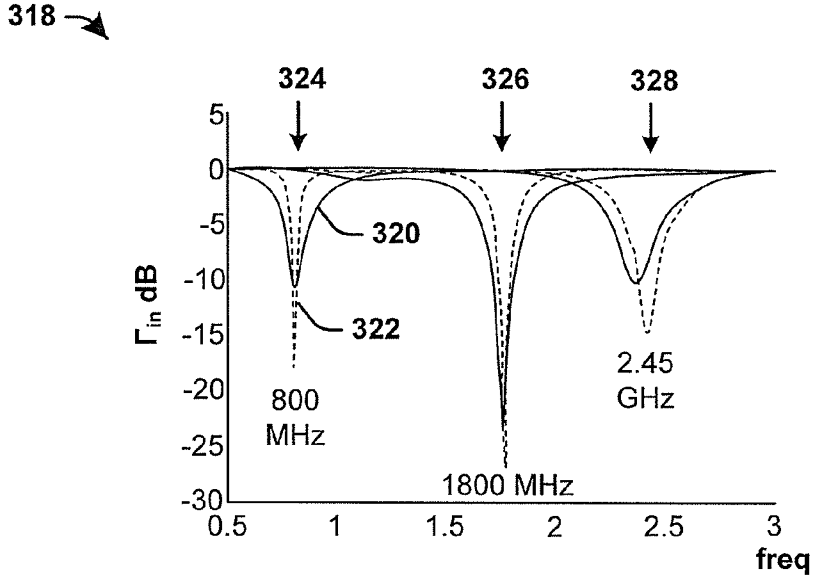

FIGS. 3A-3B illustrate an example of an operation of a disclosed tunable multi-feed antenna.

FIG. 3A illustrates a block diagram of a transmitter system 300 having a multi-feed antenna 308 (e.g., a narrowband antenna) configured to operate over a frequency range comprising a plurality of distinct frequencies.

In one example, the multi-feed antenna 308 comprises a planar inverted F antenna (PIFA). The PIFA comprises an excitable planar element 310 positioned above a ground plane 312. The excitable planar element 310 has a length of $x_1$ and a width of and is separated from the ground plane 312, which has a length of $x_2$ and a width of $y_2$, by a height h. In some examples, $x_2$ and $y_2$ are respectively larger than $x_1$ and $y_1$, resulting in a ground plane 312 that is larger than the excitable planar element 310.

The excitable planar element 310 is connected to a signal generator 302 by way a first antenna feed 314*a* and by way of a second antenna feed 314*b*, which are connected to the multi-feed antenna 308 at a plurality of antenna ports. For example, the first antenna feed 314*a* is connected to the multi-feed antenna 308 at a first antenna port $P_1$ located at a first position and the second antenna feed 314*b* is connected to the multi-feed antenna 308 at a second antenna port $P_2$ located at a second position.

In some examples, the antenna feeds, 314*a* and 314*b*, are further connected to the signal generator 302 by way of a splitter element 304 and an adjustment module 306 comprising one or more phase shifters, 306*a* and 306*b*. The splitter element 304 is configured to receive a signal to be transmitted from the signal generator 302 and to generate a first and second output signals $S_1(\phi)$ and $S_2(\phi)$, which are identical to one another. The first and second output signals $S_1(\phi)$ and $S_2(\phi)$ are provided to the adjustment module 306, which is configured to introduce a phase-shift between the first and second output signals $S_1(\phi)$ and $S_2(\phi)$, so as to generate adjusted first and second output signals $S_1(\phi_1)$ and $S_2(\phi_2)$, which have a phase shift ($\Delta\phi={}_1-\phi_2$) therebetween.

In some examples, the phase shifters 306*a* and 306*b* are configured to introduce an analog phase shift into the first and/or second output $S_1(\phi)$ and $S_2(\phi)$. For example, the phase shifters 306*a* and 306*b* may comprise variable transmission lines configured to introduce a phase shift into the first output signal $S_1(\phi)$ and/or the second output signal $S_2(\phi)$. In some examples, the phase shift introduced by an analog phase shifter may be controlled digitally (e.g., by a digital control word that controls the phase shift value(s)).

A control element 316 is configured to independently control values of the phase shift and/or amplitude difference introduced by the phase shifters 306*a* and 306*b* so as to define a frequency of transmission. In some embodiments, the control element 316 is configured to dynamically adjust the phase and/or amplitude of one or more signals, $S_1(\phi)$ and/or $S_2(\phi)$. By dynamically adjusting the phase and/or amplitude of the one or more signals, the control element 316 may enable the multi-feed antenna 308 to operate in a plurality of operating modes that transmit signals over a wide spectrum of frequencies or can account for changes to the antenna caused by changes in a user environment (e.g., changing the position of a mobile phone relative to a user). In some examples, the control element 316 is configured to cause the phase shifters 306*a* and 306*b* to provide different combinations of phase shifts and/or amplitude differences corresponding to different wireless communication standards (e.g., a first operating mode corresponds to a first wireless communication standard, and a second operating mode corresponds to a second wireless communication standard, etc.).

In one example, the multi-feed antenna 308 comprises a PIFA having an excitable planar element 310 with dimensions of $x_1$=15 mm and $y_1$=40 mm and a ground plane 312 with dimensions of $x_2$=40 mm and $y_2$=100 mm and a 1 mm thickness. The ground plane 312 is separated from the excitable planar element 310 by a height of h=4 mm. By varying the phases introduced by the adjustment elements, 306*a* and 306*b*, the control element 316 may provide for different phase shifts that correspond to a frequency of operation of 800 MHz, 1800 MHz and 2.45 GHz in both free-space and in proximity to a user (e.g., in a normal coupling scenario under the effect of the user hand).

FIG. 3B illustrates a graph 318 showing an antenna reflection coefficient $\Gamma_{in}$ (y-axis) as a function of frequency (x-axis) for different phase shift combinations. The different phase shift combinations correspond to a frequency of operation of 800 MHz, 1800 MHz and 2.45 GHz in both free-space (trendline 320) and proximity to a user (trendline 322)(e.g., in a normal coupling scenario under the effect of the user hand).

For example, in a first mode of operation 324, the control element 316 is configured to adjust the phase shifts introduced to signals $S_1$ and $S_2$ so that the multi-feed antenna 308 transmits signals at a frequency of 800 MHz. To transmit signals at a frequency of 800 MHz, the control element will introduce different phase shifts depending on whether the transmitter system 300 is operating in free space (trendline 320) or in proximity to a user (trendline 322). When the transmitter system 300 is operating in freespace, the control element 316 introduces a phase shift of $\phi_1$=187° to the first signal $S_1(\phi)$ and a phase shift of $\phi_2$=222° to the second signal $S_2(\phi)$. Alternatively, when the transmitter system 300 is operating in proximity to a user (e.g., for a user holding a cell phone), the control element 316 introduces a phase shift of $\phi_1$=153° to the first signal $S_1(\phi)$ and a phase shift of $\phi_2$=250° to the second signal $S_2(\phi)$.

In a second mode of operation 326, the control element 316 is configured to adjust the phase shifts introduced to signals $S_1(\phi)$ and $S_2(\phi)$ so that the multi-feed antenna 308 transmits signals at a frequency of 1800 MHz. When the transmitter system 300 is operating in freespace, the control element 316 introduces a phase shift of $\phi_1$=168° to the first signal $S_1(\phi)$ and a phase shift of $\phi_2$=101° to the second signal $S_2(\phi)$. When the transmitter system 300 is operating in proximity to a user, the control element 316 introduces a phase shift of $\phi_1$=159° to the first signal $S_1(\phi)$ and a phase shift of $\phi_2$=103° to the second signal $S_2(\phi)$.

In a third mode of operation 328, the control element 316 is configured to adjust the phase shifts introduced to signals $S_1(\phi)$ and $S_2(\phi)$ so that the multi-feed antenna 308 transmits signals at a frequency of 2.45 GHz. When the transmitter system 300 is operating in freespace, the control element 316 introduces a phase shift of $\phi_1$=186° to the first signal $S_1(\phi)$ and a phase shift of $\phi_2$=140° to the second signal $S_2(\phi)$. For a transmitter system 300 operating in proximity to a user (e.g., for a user holding a cell phone), the control element 316 introduces a phase shift of $\phi_1$=0° to the first signal $S_1(\phi)$ and a phase shift of $\phi_2$=324° to the second signal $S_2(\phi)$.

Figure 4:
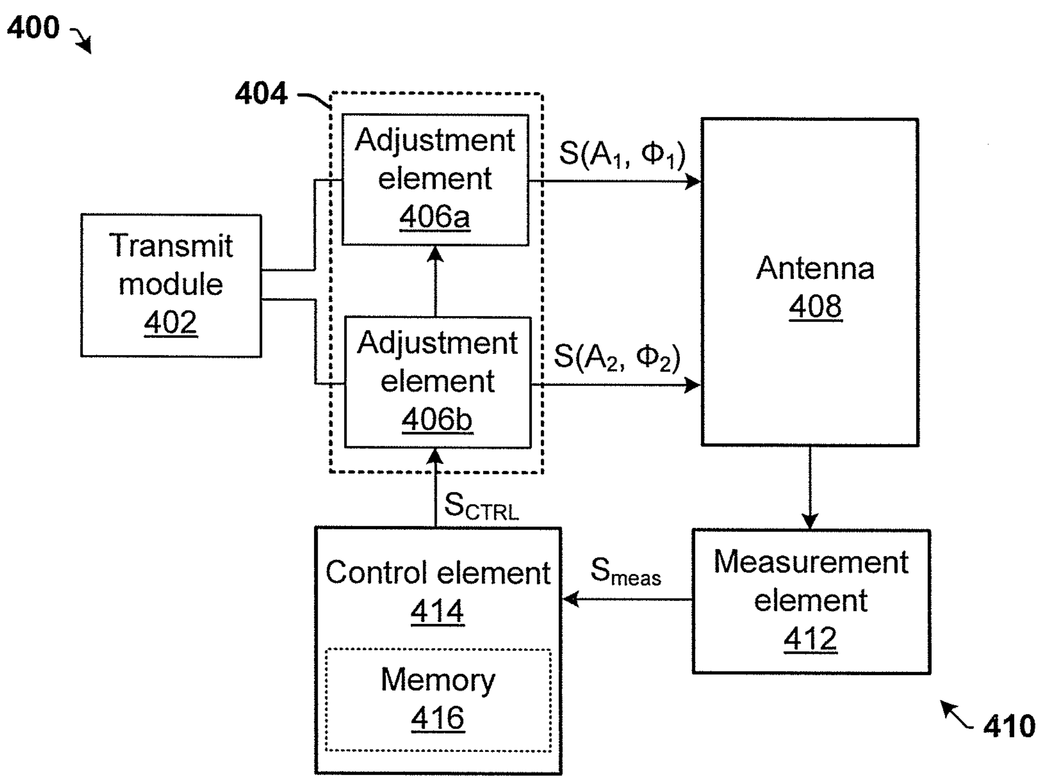
FIG. 4 illustrates an exemplary transmitter system having a control element configured to introduce a variable phase and/or amplitude to a plurality of signals provided to a tunable multi-feed antenna.

FIG. 4 illustrates a transmitter system 400 having a control element 414 configured to dynamically control one or more adjustment elements 406*a*, 406*b* within an adjustment module 404 to introduce a variable phase and/or amplitude to a plurality of signals provided from a transmit module 402 to a tunable multi-feed antenna 408.

The transmitter system 400 comprises a feedback loop 410 extending from the multi-feed antenna 408 to the control element 414. In some examples, the feedback loop 410 comprises a measurement element 412 configured to detect a frequency response comprising one or more frequency characteristics (e.g., a frequency of operation) of the multi-feed antenna 408 and to generate a measurement signal $S_{meas}$ based upon the detected frequency characteristics. The measurement signal $S_{meas}$ is provided to the control element, which in response to the received measurement signal $S_{meas}$, selectively generates a control signal $S_{CTRL}$ configured to adjust the phase and/or amplitude introduced by one or more adjustment elements 406*a*, 406*b* so as to vary the frequency of operation of the multi-feed antenna 408. In some examples, the measurement element 412 may be comprised within transmitter system 400 so that the measurement signal $S_{meas}$ comprises a local feedback signal. In other examples, the measurement element 412 is comprised within a separate transceiver, so that the measurement signal $S_{meas}$ is received from another examples configured to receive the transmitted signal.

In some examples, the measurement element 412 is configured to generate a measurement signal $S_{meas}$ when changes in the operating frequency due to user interaction and/or other proximity effects are detected. In such a case, the control element 414 is configured to receive the measurement signal $S_{meas}$ and based thereupon to adjust the phase shift and/or amplitude difference between the plurality of signals to account for changes in the operating frequency. In other cases, the measurement element is configured to periodically measure the operating frequency of the multi-feed antenna 408. Such a case can reduce power consumption of the measurement element 412.

In some examples, the control element 414 is configured to iteratively adjust the phase shift and/or amplitude difference between the plurality of signals $S_1(A_1, \phi_1), \ldots, S_n(A_n, \phi_n)$ using an iterative algorithm that changes the phase shift and/or amplitude difference until the measurement element 412 detects a desired frequency of transmission. For example, the control element 414 can use an algorithm stored in a memory element 416 to blindly converge to a frequency of transmission by changing phase shift and/or amplitude difference applied to signals and by measuring a resulting frequency of transmission (via measurement element 412), until a desired frequency of transmission is achieved.

In other examples, the control element 414 is configured to adjust the phases and/or amplitude of a plurality of signals based upon pre-determined phase and/or amplitude value combinations stored in a memory element 416 (e.g., comprising a lookup table). In such cases, the memory element 416 comprises a plurality of phase shift and/or amplitude difference combinations associated with a plurality of transmit frequencies. When the multi-feed antenna 408 is to transmit at a given frequency the control element 414 accesses the memory element 416 to determine a phase shift and/or amplitude difference that is to be used. In some examples, the memory element 416 may be configured to provide initial phase and/or amplitude values of a plurality of signals provided to a multi-feed antenna 408, while an iterative algorithm is used to adjust the value to account for changes in a frequency response of the multi-feed antenna 408 (e.g., due to external use cases).

Figure 5:
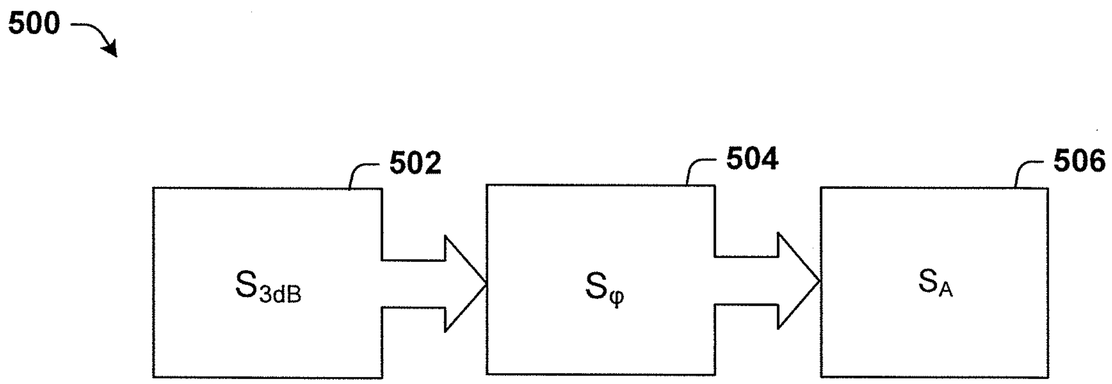
FIG. 5 illustrates a block diagram showing a cascaded network representation of a disclosed multi-feed antenna having two antenna feeds.

FIG. 5 illustrates a block diagram 500 showing a cascaded network representation of a disclosed multi-feed antenna having two antenna feeds driven by a signal generator.

The standard scattering matrix $S_A$ corresponds to transmit and receive channels when the two antenna feeds are terminated with 50Ω. Cascading the multi-feed antenna with a 3 dB power splitter $S_{3dB}$ and a phase-shifter $S_\phi$ results in an antenna input reflection coefficient $\Gamma_{in}$.

In particular, a three decibel power splitter has a scalar representation 502 of $$S_{3dB} = \begin{bmatrix} s_{11} & s_{12}^T \\ s_{21} & S_{22} \end{bmatrix}$$

where $S_{11}=0$, $S_{12}=[1\ 1]^T$, $S_{21}=[1\ 1]^T$ and $S_{22}=\begin{bmatrix}1 & 0\\ 0 & 1\end{bmatrix}$. The matrix representation 504 of the phase shifter is:

$$S_\phi = \begin{bmatrix} e^{j\phi 1} & 0 \\ 0 & e^{j\phi 2} \end{bmatrix}$$

Cascading the three decibel power splitter with the phase shifter results in an antenna input reflection coefficient $\Gamma_{in}$ having a matrix representation 506 equal to:

$$\Gamma_{in}=s_{11}+s_{12}^T(I_2-S_\phi S_A S_\phi S_{22})^{-1}S_\phi S_A S_\phi s_{21}$$

where $I_2$ is a 2×2 identity matrix. Based upon the above equation, it is clear that the antenna input reflection coefficient $\Gamma_{in}$ seen by the signal generator is function of the phase-shifts $\phi_1$ and $\phi_2$.

It will be appreciated that the disclosed tunable multi-feed antenna can be implemented in a number of ways. FIGS. 6-9 illustrate various ways of a tunable multi-feed antenna as provided herein. It will be appreciated that although the transceiver system in FIGS. 6-9 are illustrated as having two antenna feeds, that the disclosed multi-feed antenna is not limited to two antenna feeds. Rather, the disclosed multi-feed antenna may comprise any number of antenna feeds. Furthermore, although FIGS. 6-9 illustrate multi-feed antennas comprising PIFA antennas one of ordinary skill in the art will appreciate that the multi-feed antennas may comprise various types of antennas. In some embodiments, the multi-feed antennas may comprise planar inverted-F wideband antennas (PIFA) and/or multiple-input/multiple-output (MIMO) wideband antennas. In some examples, the multi-feed antennas may comprise MIMO wideband antennas and the receive antenna may comprise a wideband PIFA, for example.

Figure 6:
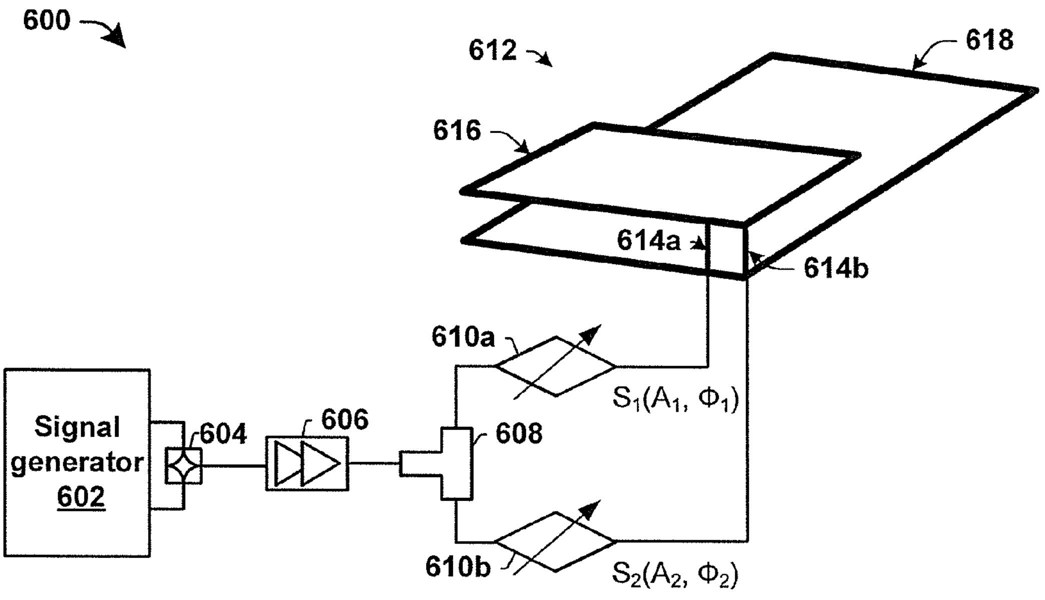
FIGS. 6-8 illustrate different aspects of a tunable multi-feed planar inverted F antenna as provided herein.

FIG. 6 illustrates an exemplary block diagram of a transmitter system 600 having a signal generator 602 connected to a multi-feed antenna 612 comprising a planar inverted F antenna (PIFA).

Signal generator 602 is configured to generate a differential signal corresponding to a signal to be transmitted. The differential signal is provided to a hybrid coupler 604, which is configured to receive the differential signal and to generate a single ended signal that is output to a balanced power amplifier 606 configured to amplify the single ended signal. By outputting a single ended signal, the signal generator 602 is compatible with conventional power amplifiers which are configured to receive a single ended signal.

The output of the balanced power amplifier 606 is provided to a splitting element 608 configured to split the output of the balanced power amplifier 606 into identical first and second signals that are provided to the multi-feed antenna 612 by way of first and second antenna feeds 614*a* and 614*b*. The splitting element 608 may comprise a T-junction or a variable hybrid coupler. The first signal is provided along a first path to a first phase shift element 610*a* and the second signal is provided along a second path to a second phase shift element 610*b*. The first and second phase shift elements, 610*a* and 610*b*, comprise analog phase shift elements configured to selectively introduce a phase shift into the first and/or second signals so as to generate a first phase shifted signal $S_1(A_1,\phi_1)$ and/or a second phase shifted signal $S_2(A_2,\phi_2)$. A phase shift between the first and second phase shifted signal enables tuning of the multi-feed antenna 612, so that by controlling the relation between the two feeds (regarding phase in this case), one can change the operational band of the PIFA.

The first phase shifted signal $S_1(A_1,\phi_1)$ is provided to a first antenna feed 614*a* connected to an excitable planar element 616 of the multi-feed antenna 612 at a first location. The second phase shifted signal $S_2(A_2,\phi_2)$ is provided to a second antenna feed 614*b* connected to the radiating planar element 616 at a second location. In some examples, the first and second antenna feeds, 614*a* and 614*b*, are connected to an area of the excitable planar element 616 having a high current density to provide better control of the tunable multi-feed antenna 612. For example, as shown in transmitter system 600, the first and second antenna feeds, 614*a* and 614*b*, are connected to a corner of the excitable planar element 616 that has a high density of current. In some examples, the second antenna feed 614*b* comprises a ground pin of the PIFA connected between the excitable planar element 616 and a ground plane 618. In such a case, the second antenna feed enables phase shifting of the ground with respect to the antennas. In other cases, neither of the first and second antenna feeds, 614*a* and 614*b*, are connected to the ground plane 618.

Figure 7:
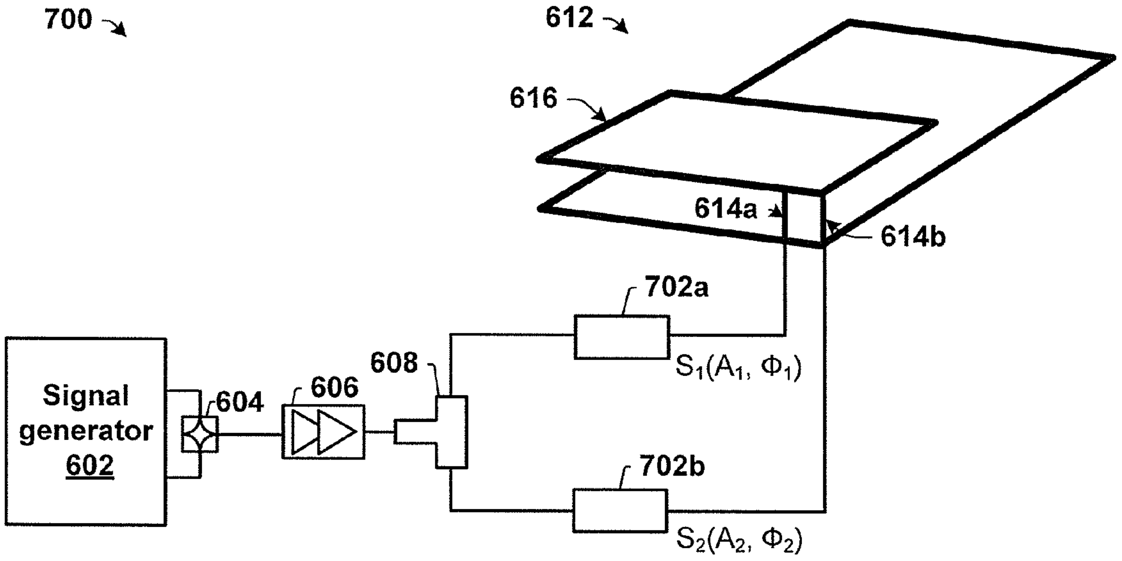

It will be appreciated that the phase shift elements provided herein may be implemented as various elements configured to introduce a phase shift into the signals. For example, FIG. 7 illustrates some examples of a transmitter system 600 having phase shift elements comprising variable length transmission lines 702.

In particular, a splitting element 608 is configured to provide a first signal to a first variable length transmission line 702*a* by way of a first path and a second signal to a second variable length transmission line 702*b* by way of a second path. The first and second variable length transmission lines 702*a* and 702*b* are configured to introduce a variable phase shift into the first and second signals before they are provided to a multi-feed antenna 612.

Figure 8:
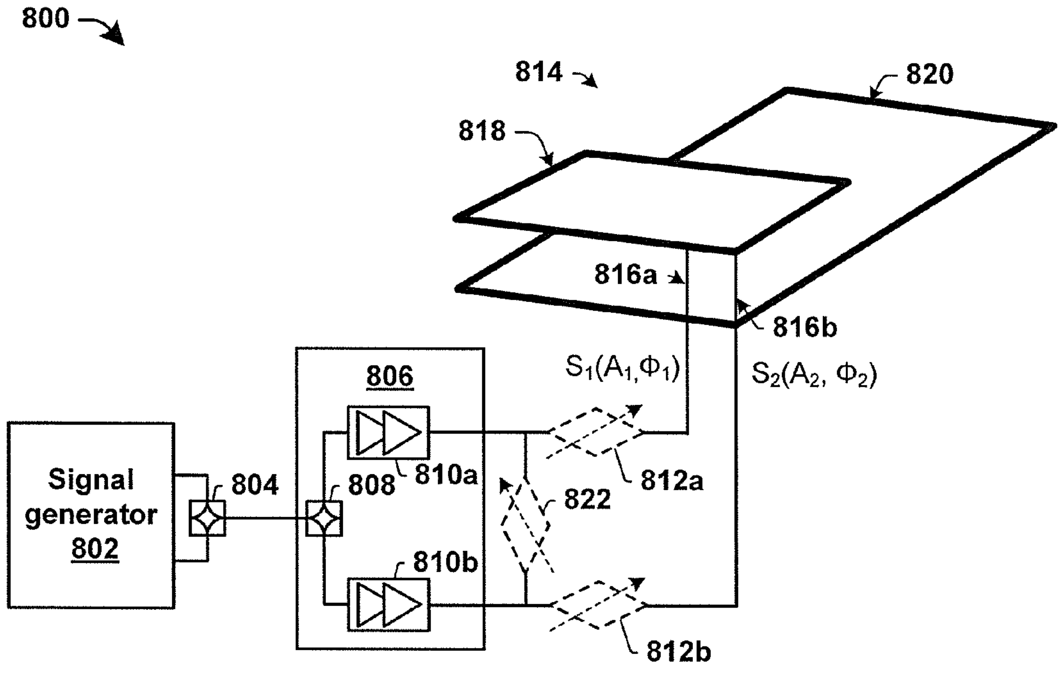

FIG. 8 illustrates an exemplary block diagram of a transmitter system 800 having a balanced architecture that can reduce the RF front end complexity.

Transmitter system 800 comprises a signal generator 802 configured to output a differential signal to a first hybrid coupler 804. The first hybrid coupler 804 provides a single ended signal to a balanced power amplifier 806 having a second hybrid coupler 808 configured to split the received single ended signal into a differential signal. The differential signal is provided to a first signal path having a first power amplifier 810*a* and to a second signal path having a second power amplifier 810*b* within the balanced power amplifier 806. By using a balanced power amplifier 806, the output of power amplifiers 810*a* and 810*b* can be provided directly to the multi-feed antenna 814 by way of first and second antenna feeds, 816*a* and 816*b*. In some case, a microstrip line 822 is positioned between the first and second signal paths, at a location downstream of power amplifiers 810*a*, 810*b*. The microstrip line 822 provides for improved control of the impedance of the tunable multi-feed antenna 814.

In some examples, the signal generator 802 comprises an digital circuit configured to introduce a variable phase shift between branches of the differential signal (i.e., the signal generator 802 is configured to output a differential signal to which phase shifts have already been introduced into the signals). In such cases, the balanced power amplifier 806 can additionally control the amplitude of the signals, $S_1(A_1,\phi_1)$ and $S_2(A_2,\phi_2)$, provided to the multi-feed antenna 814. In other cases, analog phase shift elements, 812*a* and 812*b*, located downstream of the balanced power amplifier 806 are configured to selectively provide a variable phase shift to the signals, $S_1(A_1,\phi_1)$ and $S_2(A_2,\phi_2)$, provided to the multi-feed antenna 814.

In some examples, a digital signal generator is configured to introduce a phase shift into the signals provided to the multi-feed antenna, $S_1(A_1,\phi_1)$ and $S_2(A_2,\phi_2)$, by way of a register shift operation. The shift register operation utilizes a shift register to introduce a phase shift to the first or second signal by way of a digitally controlled delay having a value that is a multiple of a clock period. For example, a shift register is configured to introduce a first delay value to a first signal according to a first digital word, and to introduce second delay value to a second signal according to a second digital word. By varying the delays introduced between the first and second signals, the shift register can vary the phase shift between the first and second signals.

Figure 9:
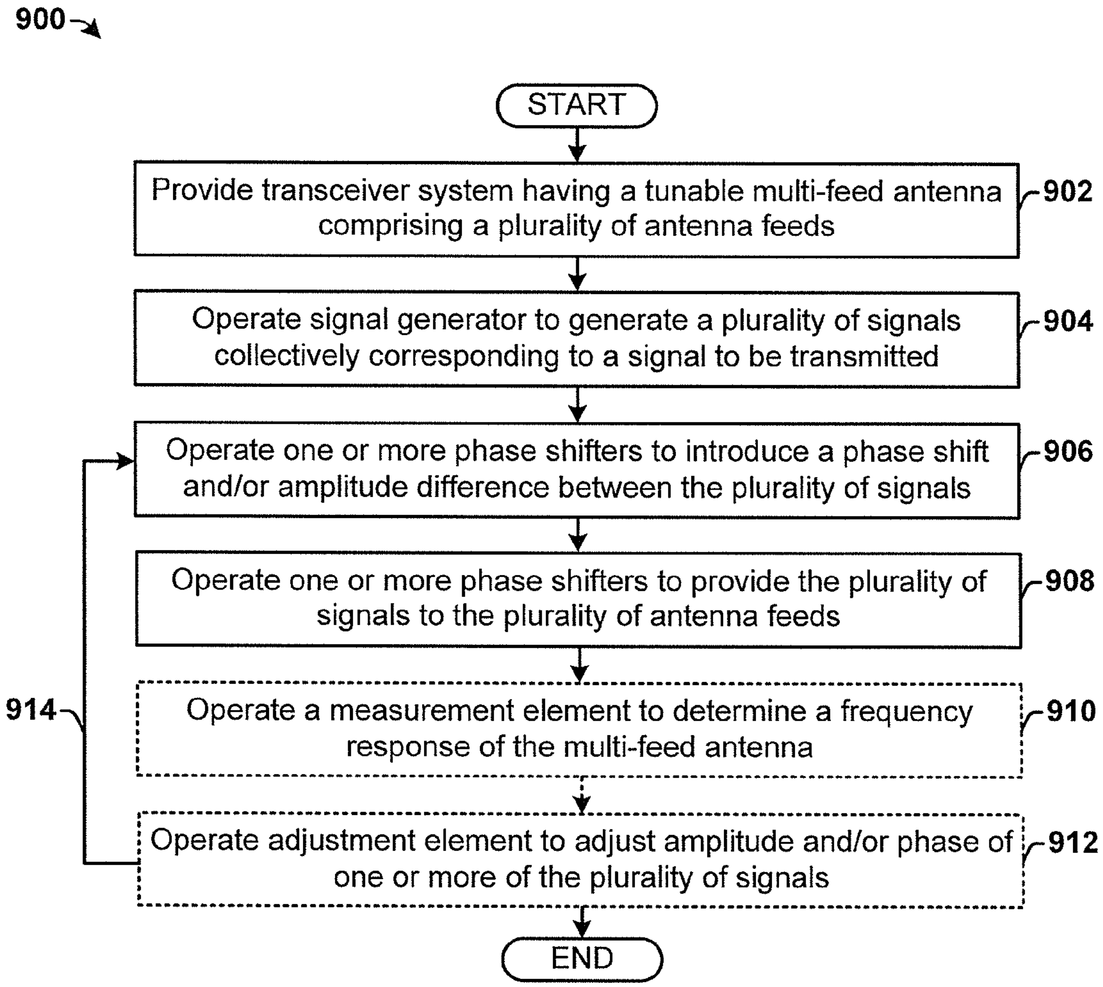
FIG. 9 is a flow diagram of an exemplary method for tuning a frequency of a tunable multi-feed antenna.

FIG. 9 is a flow diagram of an exemplary method 1000 for tuning a frequency of a multi-feed antenna.

While the disclosed method 900 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects of the description herein. Further, one or more of the acts depicted herein may be carried out in one or more separate acts and/or phases.

At 902, a transceiver system having a tunable multi-feed antenna comprising a plurality of antenna feeds is provided. In some examples, the plurality of antenna feeds comprise a first antenna feed connected to a first spatial position of the multi-feed antenna and a second antenna feed connected to a second spatial position of the multi-feed antenna. In other examples, the plurality of antenna feeds may comprise three or more antenna feeds respectively connected to different spatial positions of the multi-feed antenna.

At 904, a signal generator operates to generate a plurality of signals, which collectively correspond to a signal to be transmitted. The plurality of signals are identical to one another.

At 906, one or more phase shifters operate to introduce a phase shift and/or amplitude difference between the plurality of signals. The phase shift and/or amplitude difference define frequency characteristics of the signal to be transmitted. The frequency characteristics may comprise a frequency of transmission and/or a size of the frequency of transmission, for example.

At 908, after the difference is generated, the phase shifters operate to provide a plurality of signals to the plurality of antenna feeds. For example, a first signal is provided to a first antenna feed and a second signal is provided to a second antenna feed.

At 910, a measurement element operates to determine a frequency response of the multi-feed antenna. In some embodiments, the frequency response may comprise a frequency of transmission.

In some cases, at 912, the adjustment elements operate to adjust an amplitude and/or phase of one or more of the plurality of signals to change the frequency characteristics of the transmitted signal. The adjusted amplitude and/or phase are then introduced by the adjustment elements into the plurality of signals at 906. Steps 906-912 are iteratively performed (step 914) to achieve a desired frequency of transmission.

Figure 10:
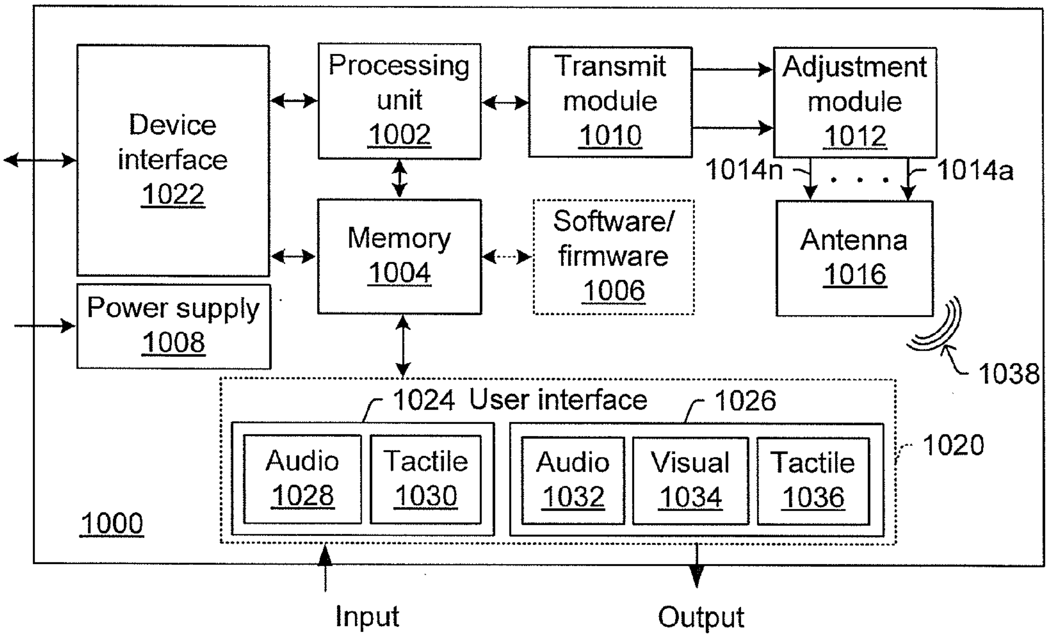
FIG. 10 illustrates an example of a mobile communication device.

FIG. 10 illustrates an example of a mobile communication device 1000, such as a mobile phone handset for example. Mobile communication device 1000 includes at least one processing unit 1002 and memory 1004. Depending on the exact configuration and type of mobile communication device, memory 1004 may be volatile (such as RAM, for example), non-volatile (such as ROM, flash memory, etc., for example) or some combination of the two. Memory 1004 may be removable and/or non-removable, and may also include, but is not limited to, magnetic storage, optical storage, and the like. In some examples, computer readable instructions in the form of software or firmware 1006, which are configured to implement one or more examples provided herein, may be stored in memory 1004. The computer readable instructions may be loaded in memory 1004 for execution by processing unit 1002. Other peripherals, such as a power supply 1008 (e.g., battery) may also be present.

Processing unit 1002 and memory 1004 work in coordinated fashion along with a transmit module 1010 to wirelessly communicate with other devices by way of a wireless communication signal 1038 (e.g., that uses frequency modulation, amplitude modulation, phase modulation, and/or combinations thereof to communicate signals to another wireless device). To facilitate this wireless communication, a transmit antenna 1016 is coupled to transmit module 1010 by way of an adjustment module 1012 and a plurality of antenna feeds 1014*a*, . . . , 1014*n*. The transmit module 1010 is configured to output a plurality of identical signals to the adjustment module 1012, which is configured to independently control phase and/or amplitude value of one or more of the identical signals. Respective signals, having different phases and/or amplitudes are then provided to different antenna feeds 1014*a*, . . . , 1014*n*, so that a plurality of signals having different phases and/or amplitudes are concurrently provided to the transmit antenna to drive the antenna to operate at a frequency that is dependent upon a phase shift and/or amplitude difference between the signals.

To improve a user's interaction with the mobile communication device 1000, the mobile communication device 1000 may include a number of interfaces that allow the mobile communication device 1000 to exchange information with the external environment. These interfaces may include one or more user interface(s) 1020, and one or more device interface(s) 1022, among others.

If present, user interface 1020 may include any number of user inputs 1024 that allow a user to input information into the mobile communication device 1000, and may also include any number of user outputs 1026 that allow a user to receive information from the mobile communication device 1000. In some mobile phones, the user inputs 1024 may include an audio input 1028 (e.g., a microphone) and/or a tactile input 1030 (e.g., push buttons and/or a keyboard). In some mobile phones, the user outputs 1026 may include an audio output 1032 (e.g., a speaker), a visual output 1034 (e.g., an LCD or LED screen), and/or tactile output 1036 (e.g., a vibrating buzzer), among others.

Device interface 1022 may include, but is not limited to, a modem, a Network Interface Card (NIC), an integrated network interface, a radio frequency transmitter/receiver, an infrared port, a USB connection, or other interfaces for connecting mobile communication device 1000 to other devices. Device connection(s) 1022 may include a wired connection or a wireless connection. Device connection(s) 1022 may transmit and/or receive communication media.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. An antenna configuration, comprising:

a tunable multi-feed antenna configured to wirelessly transmit electromagnetic radiation at a frequency band;

a transmit module configured to generate a plurality of signals having a phase shift or amplitude difference therebetween, wherein the plurality of signals collectively correspond to a signal to be transmitted;

a plurality of antenna feeds coupled to different spatial locations of a single excitation element of the tunable multi-feed antenna and configured to provide the plurality of signals, respectively, to the tunable multi-feed antenna;

an adjustment module configured to selectively adjust an antenna input reflection coefficient of the tunable multi-feed antenna to define a frequency of transmission by independently controlling at least one of a phase or an amplitude of one or more of the plurality of signals to generate a phase shift or amplitude difference between at least two of the plurality of signals;

wherein the phase shift or amplitude difference of the plurality of signals define frequency characteristics of the frequency band.

2. The antenna configuration of claim 1, wherein the transmit module further comprises:

a control element configured to generate a control signal that controls values of the phase or amplitude from the adjustment module to provide the phase shift or amplitude difference between the at least two of the plurality of signals.

3. The antenna configuration of claim 2, further comprising:

a measurement element configured to detect the frequency characteristics and to generate a measurement signal comprising information relating to the detected frequency characteristics;

wherein the control element is configured to adjust the control signal to adjust the phase shift or amplitude difference between the at least two of the plurality of signals based upon the measurement signal.

4. The antenna configuration of claim 2, further comprising:

a measurement element configured to detect the frequency characteristics and to generate a measurement signal causing the control element iteratively adjust the phase shift or amplitude difference between the plurality of signals until a frequency of transmission is achieved.

5. The antenna configuration of claim 2, wherein the adjustment module comprises:

one or more phase shift elements configured to introduce the phase shift to one or more of the plurality of signals generated by the transmit module.

6. The antenna configuration of claim 2, wherein the adjustment module is configured to dynamically adjust the phase shift between the plurality of signals to dynamically adjust the frequency characteristics of the signal to be transmitted.

7. The antenna configuration of claim 1, wherein the frequency characteristics comprise a frequency at which the tunable multi-feed antenna transmits the electromagnetic radiation.

8. The antenna configuration of claim 1, wherein the transmit module comprises:

a signal generator configured to generate a differential signal to be transmitted;

a hybrid coupler configured to receive the signal to be transmitted and to generate a single ended signal;

a splitting element configured to split the single ended signal into a plurality of identical signals; and one or more phase shift elements configured to introduce a phase shift to one or more of the plurality of identical signals.

9. The antenna configuration of claim 8, further comprising:

a power amplifier configured to amplify the single ended signal and to output the signal ended signal to the splitting element.

10. The antenna configuration of claim 8, wherein the one or more phase shift elements comprise variable length transmission lines extending between the one or more phase shift elements and the plurality of antenna feeds.

11. The antenna configuration of claim 1, wherein the transmit module comprises:

a signal generator configured to generate a differential signal;

a first hybrid coupler configured to receive the differential signal and to generate a single ended signal therefrom;

a second hybrid coupler configured to receive the single ended signal and to generate the plurality of identical signals along a plurality of signal paths therefrom; and one or more phase shift elements configured to introduce a phase shift to one or more of the plurality of identical signals.

12. The antenna configuration of claim 1, wherein one of the antenna feeds comprises a ground pin extending between a ground plane and an excitable planar element of a planar inverted F antenna.

13. An antenna configuration configured to transmit a wireless signal over multiple output frequencies, comprising:

a tunable multi-feed antenna configured to wirelessly transmit electromagnetic radiation;

a plurality of antenna feeds coupled to different spatial locations of a single excitation element of the tunable multi-feed antenna;

a transmit module configured to generate a plurality of signals collectively corresponding to a signal to be transmitted and to provide the plurality of signals to the tunable multi-feed antenna; and an adjustment module configured to selectively adjust an antenna input reflection coefficient of the tunable multi-feed antenna to define a frequency of transmission by independently controlling at least one of a phase or an amplitude of at least one of the plurality of signals to generate a phase shift or amplitude difference between at least two of the plurality of signals.

14. The antenna configuration of claim 13, comprising:

a control element in communication with the adjustment module and configured to generate a control signal that dynamically varies a value of the phase shift or amplitude difference to provide a phase shift between the plurality of signals that defines the frequency of transmission.

15. The antenna configuration of claim 14, further comprising:

a measurement element configured to detect the frequency of transmission and to generate a measurement signal comprising information relating to the detected frequency of transmission;

wherein the control element is configured to adjust the control signal to adjust the phase shift or amplitude difference between the plurality of signals based on the measurement signal.

16. The antenna configuration of claim 14, further comprising:

a measurement element configured to detect the frequency of transmission and to generate a measurement signal causing the control element iteratively adjust the phase shift or amplitude difference between the plurality of signals until the frequency of transmission is achieved.

17. The antenna configuration of claim 13, wherein the antenna comprises an ultra-wideband antenna.

18. A method of tuning an antenna over multiple transmission frequencies, comprising:

providing a transceiver system having a tunable multi-feed antenna comprising a plurality of antenna feeds that couple to different spatial locations, respectively, of a single excitation element of the tunable multi-feed antenna;

generating a plurality of signals having a phase shift therebetween, wherein the plurality of signals collectively correspond to a signal to be transmitted;

altering an antenna input reflection coefficient of the tunable multi-feed antenna to define a frequency of transmission by introducing a phase shift or amplitude difference to one or more of the plurality of signals to generate an adjusted plurality of signals having a phase shift or amplitude difference from among signals of the adjusted plurality of signals; and providing the adjusted plurality of signals to the plurality of antenna feeds to collectively excite the tunable multi-feed antenna.

19. The method of claim 18, further comprising:

determining a frequency response of the tunable multi-feed antenna;

determining one or more adjusted phases or amplitudes based upon the frequency response to tune the tunable multi-feed antenna to a desired frequency of operation; and introducing the one or more adjusted phases or amplitudes to the plurality of signals.

20. The method of claim 18, further comprising:

iteratively adjusting the one or more phases or amplitudes until the frequency of transmission is achieved.

* * * * *